(No Model.)
W. H. DANIELL.
WATER CLOSET AND GARBAGE SINK.
No. 256,549. Patented Apr. 18, 1882.
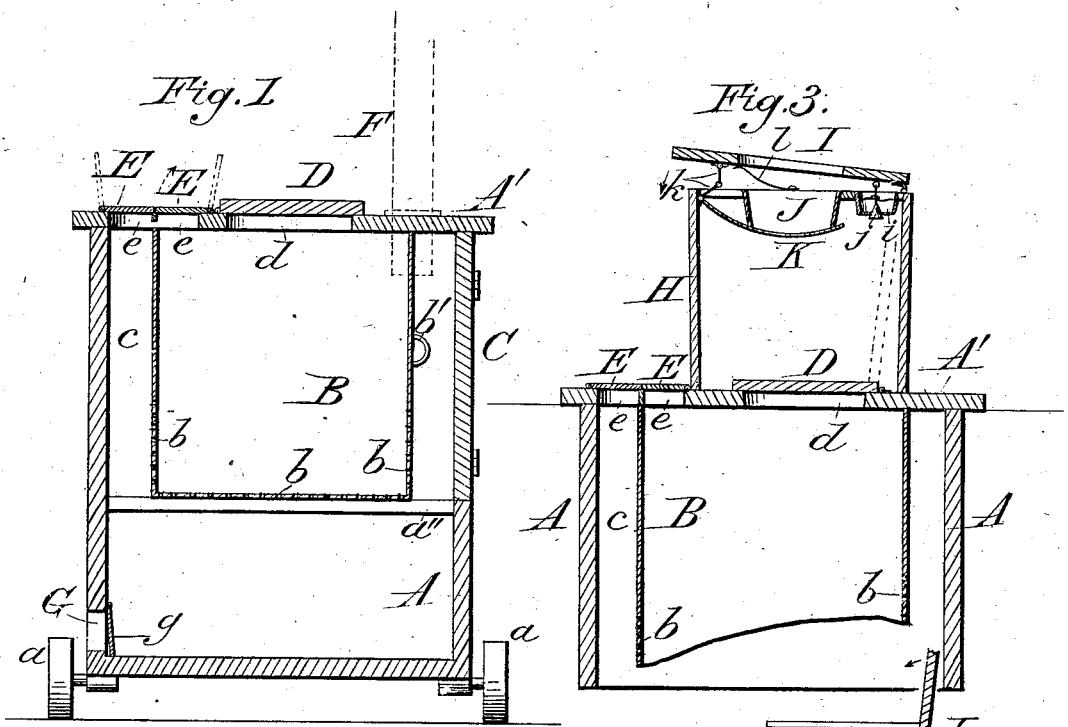
Witnesses:
F. H. Schott
A. R. Brown
Inventor
William H. Daniell
Per C. H. Watson & Co.
Attorneys.

UNITED STATES PATENT OFFICE.

WILLIAM H. DANIELL, OF POTTSVILLE, PENNSYLVANIA.

WATER-CLOSET AND GARBAGE SINK.

SPECIFICATION forming part of Letters Patent No. 256,549, dated April 18, 1882.

Application filed May 21, 1881. (No model.)

*To all whom it may concern:*

Be it known that I, WILLIAM H. DANIELL, of Pottsville, in the county of Schuylkill and State of Pennsylvania, have invented certain new and useful Improvements in Earth and Water Closet Sinks and Garbage-Receptacles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to odorless and portable or stationary earth and water closet sinks and garbage-receptacles; and it consists in the construction and arrangement of parts, as hereinafter more fully described and claimed.

In the annexed drawings, which fully illustrate the invention, Figure 1 is a vertical section on the line $x\ x$ of a portable water-closet sink or receptacle for garbage. Fig. 2 is a plan of the same. Fig. 3 is a stationary apparatus of similar construction, adapted more particularly for use as an odorless water-closet. Fig. 4 is a vertical section of water-closet, taken on the line $y\ y$; and Fig. 5 is a plan or top view of the same.

Like letters indicate similar parts in the several views.

A represents an outer case or receptacle, that may be supported upon wheels $a\ a$, as shown in Fig. 1, so as to be readily removed, when desired, being provided with handles $a'$, or the case may be arranged below ground, as shown in Fig. 3.

Within the receptacle A is a support, $a''$, for the inner receptacle, B, which is provided with perforations $b\ b$ at bottom and sides, and has handles $b'$, by which it may be removed, when desired, through a door, C, in the side of the outer receptacle. The inner receptacle, B, fits closely under the cover A' of the outer receptacle, but is smaller in diameter than the latter, so that a sufficient space is left on one side for the handles $b'$ and on another side for an opening or vertical channel, $c$, through which the contents of the outer receptacle may be removed by means of a pump.

The cover A' is provided with one or more commode-openings, $d$, directly over the inner receptacle, and closed by lids D. It also has a garbage-opening, $e$, on one side, arranged partly over the inner receptacle and partly over the outer one, so as to communicate with both, said opening being closed by the lids E E.

A ventilating-pipe, F, is provided on one side, and at the lower part of the outer receptacle is an opening, G, through which the contents of said receptacle may be withdrawn, if desired, and which opening can be closed by a valve, $g$, that prevents the escape of such contents until their removal is required.

This form of garbage-sink and water-closet is especially adapted for use at seaside summer-resorts, and in large hotels situated in places where there is an insufficient drainage, as the receptacles are so constructed that decomposition of matters contained therein is greatly retarded by reason of the separation of their solid and liquid parts through the perforations in the inner receptacle. The sink is also conveniently arranged for removing its contents either by hauling away and emptying the entire sink at once, or by withdrawing the inner receptacle, B, through the door C and emptying its solid contents, while the liquids that percolate through the perforated inner receptacle into the main sink are withdrawn from the latter through the opening G, or pumped through the channel $c$ and opening $e$ above the same. The contents of the sink may thus be readily removed, when required, and be conveyed after deodorizing to suitable places for manufacture into fertilizing compounds, if desired, without unpleasant odors or injury to health.

By covering the inner and outer sides of the receptacle B and the inner side of the receptacle A with a suitable vitreous compound, so as to impart a glazed non-absorbent surface to the same, they may be more readily cleansed and be less liable to retain foul odors.

When the receptacles A B are placed underground, as shown in Fig. 3, a leader-pipe or seat-body, H, is placed over the opening $d$, and the lid D is raised within this pipe and kept in that position until it is desired to remove or separate the parts.

At the top of the leader-pipe H is a hinged seat-frame, I, having a suitable opening, beneath which is a bowl or sleeve, J, the lower end of which is governed by a pan, K, which is attached by lever-arms k k to the seat-frame, so as to be operated when the closet is in use.

Adjoining the bowl K is a box or receptacle, i, for disinfectants and deodorizers, which is provided with a spring-valve, j, that is connected with the seat frame in such a manner as to discharge a certain quantity of disinfectant into the sink, when the lid is closed and raised, a spring, l, being provided that forces the seat-frame slightly open when not in use, so as to close the valve-opening in the disinfectant-box, and also hold the pan K in close contact with the lower end of the bowl, so as to effectually prevent the escape of odors.

A close cover, L, may be hinged to the upper part of the leader-pipe H, and is provided with bracket-arms M, that turn down in openings or slots m m in each side of the seat-frame, rods n being attached to the brackets M, and having curved lugs at their ends, which engage with the slots m when the cover or lid is raised, thus forming in connection therewith a comfortable support to the back and arms.

When the outer receptacle is placed in a sandy soil or over a good drainage, its bottom may be perforated or left entirely open, if desired, so as to permit the escape of fluids, all solid matter being retained, however, by the inner receptacle, as above described.

It will be understood that I do not confine myself to the precise construction of sink herein described. Nor do I herein claim the construction of parts shown in Figs. 3, 4, and 5, such being reserved for a future application; but What I now claim as my invention, and desire to secure by Letters Patent, is—

The combination, with the outer receptacle, A, having cover A', provided with openings d e, closed by lids D E, of the inner perforated receptacle, B, substantially as and for the purpose specified.

In testimony that I claim the foregoing as my own I have hereto affixed my signature in presence of two witnesses.

WILLIAM H. DANIELL.

Witnesses:
M. L. WATSON,
JNO. A. STOCKMAN.